United States Patent [19]
Huang et al.

[11] Patent Number: 5,933,804
[45] Date of Patent: Aug. 3, 1999

[54] EXTENSIBLE SPEECH RECOGNITION SYSTEM THAT PROVIDES A USER WITH AUDIO FEEDBACK

[75] Inventors: Xuedong D. Huang, Woodinville; Michael J. Rozak, Issaquah; Li Jiang, Redmond, all of Wash.

[73] Assignee: Microsoft Corporation, Redmond, Wash.

[21] Appl. No.: 08/833,916

[22] Filed: Apr. 10, 1997

[51] Int. Cl.$^6$ ................................ G10L 5/06; G10L 5/02
[52] U.S. Cl. .................... 704/244; 704/251; 704/260
[58] Field of Search ................... 704/235, 200, 704/231, 275

[56] References Cited

U.S. PATENT DOCUMENTS

| | | | |
|---|---|---|---|
| 4,509,133 | 4/1985 | Monabaron et al. | 704/235 |
| 4,516,260 | 5/1985 | Breedlove et al. | 381/51 |
| 4,749,353 | 6/1988 | Breedlove | 434/169 |
| 5,503,560 | 4/1996 | Stentiford | 434/167 |
| 5,623,578 | 4/1997 | Mikkilineni | 704/255 |
| 5,681,108 | 10/1997 | Miller | 364/411 |
| 5,737,487 | 4/1998 | Bellegarda et al. | 704/235 |

FOREIGN PATENT DOCUMENTS 07306851  11/1995  Japan .

OTHER PUBLICATIONS

"Application Programming Interface (API) Reference", Version 1.0–Apr. 1997.
"A Statistical Model for Generating Pronunciation Networks", by Michael D. Riley, *IEEE*, 1991, pp. 737–740.
"Dictionary Learning: Performance Through Consistency", by Tilo Sloboda, *IEEE*, 1995, pp. 453–456.
"Automatic Modeling for Adding New Words to a Large–Vocabulary Continuous Speech Recognition System", by Ayman Asadi, Richard Schwartz and John Makhoul, *IEEE*, 1991, pp. 305–308.
Riley, Michael D., and Andrej Ljolje, "Automatic Generation of Detailed Pronunciation Lexicons," Chapter 12 of Automatic Speech and Speaker Recognition, 1996, pp. 285–301.
Das, S.K., "Issues in Practical Large Vocabulary Isolated Word Recognition: The IBM Tangora System", Chapter 19 of Automatic Speech and Speaker Recognition, 1996, pp. 457–479.
Freed, Les, "Emerging User Interfaces Recognizing The Future," PC Magagine, Mar. 25, 1997, pp. 210, 211, and 213.

*Primary Examiner*—David R. Hudspeth
*Assistant Examiner*—Abul K. Azad
*Attorney, Agent, or Firm*—Westman, Champlin & Kelly, P.A.

[57] ABSTRACT

A speech recognition system is extensible in that new terms may be added to a list of terms that are recognized by the speech recognition system. The speech recognition system provides audio feedback when new terms are added so that a user may hear how the system expects the word to be pronounced. The user may then accept the pronunciation or provide his own pronunciation. The user may also selectively change the pronunciation of words to avoid misrecognitions by the system. The system may provide appropriate user interface elements for enabling a user to change the pronunciation of words. The system may also include intelligence for automatically changing the pronunciation of words used in recognition based upon empirically derived information.

51 Claims, 14 Drawing Sheets

EXTENSIBLE SPEECH RECOGNITION SYSTEM THAT PROVIDES A USER WITH AUDIO FEEDBACK

TECHNICAL FIELD

Present invention relates generally to data processing systems and more particularly, to an extensible speech recognition system that provides a user with audio feedback.

BACKGROUND OF THE INVENTION

Speech recognition systems enable a computer system to understand at least selected portions of speech that are input to the computer system. In general, speech recognition systems parse input speech into workable segments that may be readily recognized. For example, input speech may be parsed into phonemes that are further processed to recognize the content of the speech. Typically, speech recognition systems recognize words in input speech by comparing the pronunciation of the word in the input speech with patterns or templates that are stored by the speech recognition system. The templates are produced using phonetic representations of the word and context-dependent templates for the phonemes. Many speech recognition systems include dictionaries that specify the pronunciations of terms that are recognized by the speech recognition system.

One place in which speech recognition systems are used is in dictation systems. Dictation systems convert input speech into text. In such dictation systems, the speech recognition systems are used to identify words in the input speech, and the dictation systems produce textual output corresponding to the identified words. Unfortunately, these dictation systems often experience a high level of misrecognition of speech input from certain users. The speech recognition systems employed within such dictation systems have one or more pronunciations for each word, but the pronunciations of the words are static and represent the pronunciation that the speech recognition system expects to hear. If a user employs a different pronunciation for a word than that expected by the speech recognition system, the speech recognition system will often fail to recognize the user's input. This drawback can be especially vexing to a user when a term has multiple proper pronunciations and the user employs one of the pronunciations that is not covered by the dictionary of the speech recognition system.

Another limitation of such dictation systems is that they are either not extensible (i.e., a user may not add a new term to the dictionary) or they permit the addition of new terms but generate their own pronunciation of the new term without allowing the user to discover the pronunciation(s). Such systems may use letter-to-sound heuristics to guess at the pronunciation of a newly added term. Unfortunately, such heuristics do not yield correct results in many instance. Oftentimes, when a user adds a new term to extend the dictionary used in a dictation system, the user merely enters the new term without providing a pronunciation, and the speech recognition system generates a pronunciation for the new term. This new pronunciation may be incorrect or may not correspond with the user's anticipated pronunciation of the word. As a result, there is often a high degree of misrecognition relative to speech input that uses the newly added term or that includes the newly added term.

SUMMARY OF THE INVENTION

The above-described limitations of the prior art are overcome by the present invention. In accordance with a first aspect of the present invention, a method is practiced by a computer-implemented speech recognition system that recognizes speech input from a speaker. In accordance with this method, a text-to-speech mechanism is provided for creating a spoken version of text. The text-to-speech mechanism is utilized to generate a spoken version of a given word, and the spoken version of the given word is output on the audio output device so that a user of the speech recognition system knows how the speech recognition system expects a given word to be pronounced. The text-to-speech mechanism generates a pronunciation for the given word which corresponds with the pronunciation that the speech recognition system expects to hear for the given word. In particular, the text-to-speech mechanism may share the same letter-to-sound component with the given speech recognition system so that the pronunciation of the spoken version of the given word generated by the text-to-speech mechanism is identical to the pronunciation that the speech recognition system expects to hear.

In accordance with another aspect of the present invention, a list of pronunciations for words that are recognized by a dictation system are provided. A request is received from a user to change a current pronunciation of a selected word that is stored in the list to a new pronunciation. The request specifies the new pronunciation. The pronunciation that is stored in the list for the selected word is changed from the current pronunciation to the new pronunciation in response to the request.

In accordance with a further aspect of the present invention, a method is performed by a computer-implemented speech recognition system. A dictionary of terms that the speech recognition system recognizes is provided, and the dictionary specifies how the speech recognition system expects each term to be pronounced. A request is received from a user to add a new term to the dictionary and a pronunciation for the new term is generated by the speech recognition system. The pronunciation of the new term is output on an audio output device, using the text-to-speech mechanism (with the speech recognition system's expected pronunciation for the new term as input), and the new term as well as the generated pronunciation are added to the dictionary.

In accordance with yet another aspect of the present invention, multiple pronunciations for a selected term are stored in a dictionary of a speech recognition system. Each of the pronunciations for the selected term is output on the audio output device so that a user can hear the pronunciation. In response to a user selecting one of the pronunciations, the selected pronunciation is used by the speech recognition system to recognize speech.

In accordance with another aspect of the present invention, a dictionary of terms having pronunciations for each term is provided. The pronunciations correspond with how a speech recognition system expects the terms to be pronounced. In multiple instances where the speaker speaks a selected one of the terms so that the speech recognition system recognizes the selected term, the specific pronunciation of the selected term the user used is determined. Based on this repeated determination, the system identifies which of the alternative pronunciations of the selected term the user is most likely using and updates the dictionary to designate that pronunciation as the pronunciation that the speech recognition system expects.

In accordance with a further aspect of the present invention, the spoken version of a term that has given pronunciation is received from a speaker. An expected pronunciation for the term is provided. The expected pronunciation corresponds to how the speech recognition system expects the speaker to speak the term. The given pronunciation of the spoken version of the term is compared with the expected pronunciation to determine the degree of difference. Where the degree of difference exceeds an acceptable predetermined threshold, output is generated on an output device to inform the speaker that the degree of difference exceeds the threshold. The output may also include an expected pronunciation of the term generated by the text-to-speech mechanism.

In accordance with an additional aspect of the present invention, a computer-implemented speech recognition system recognizes spoken speech from a speaker. An expected pronunciation is provided for a given word. The expected pronunciation constitutes how the speech recognition system expects a given word to be pronounced by the speaker. Statistics are gathered regarding how frequently the given word as spoken from the speaker is misrecognized by the speech recognition system. Where the statistics indicate that the given word is misrecognized more frequently than a threshold value, the user is prompted by generating output on the display device to correct the expected pronunciation of the given word.

BRIEF DESCRIPTION OF THE DRAWINGS

A preferred embodiment of the present invention will be described in more detail below relative to the following figures.

DETAILED DESCRIPTION OF THE INVENTION

The preferred embodiment of the present invention provides an extensible speech recognition system that provides a user with audio feedback. Thus, when a user seeks to add a word or term to a dictionary used by the speech recognition system, the user is provided with audio feedback that identifies how the system believes the term should be pronounced. The user may then accept this pronunciation or request that the pronunciation be changed. In one alternative, the user specifies the pronunciation of the word by spelling out how the word should sound. In another alternative, the system provides the user with a list of alternative pronunciations for the word and the user chooses the word.

The preferred embodiment of the present invention enables a user to change the pronunciation of any of the words that are currently in the dictionary. In addition, the preferred embodiment to the present invention enables a user to hear the pronunciation currently assigned to a word within the dictionary. The user may hear the pronunciation and then change the pronunciation to an alternative pronunciation if desired. As a result, the user may greatly enhance the level of recognition of terms achieved by the speech recognition system.

In another alternative, the dictionary used by the speech recognition system is automatically and transparently updated by the system. The system processes a corpus of pronunciation data to derive alternative pronunciations for terms within the dictionary. When the user speaks a term and the term is properly recognized, the system identifies which of the alternative pronunciations the user spoke. After a fixed number of proper recognitions and comparisons, the system obtains a degree of confidence in the pronunciation that the user is speaking and changes the dictionary (including propagating the change in observed entries to other unobserved entries in a systematic way) to utilize that pronunciation so as to enhance the degree of recognition realized by the system.

The preferred embodiment of the present invention will be described below relative to a dictation system. In the dictation system, the user speaks into an audio input device, such as a microphone, to enter spoken text. The dictation system recognizes the spoken text and produces corresponding text as part of a document. Those skilled in the art will appreciate that the present invention may also be practiced in contexts other than a dictation system. The present invention applies more generally to speech recognition systems.

Figure 1:
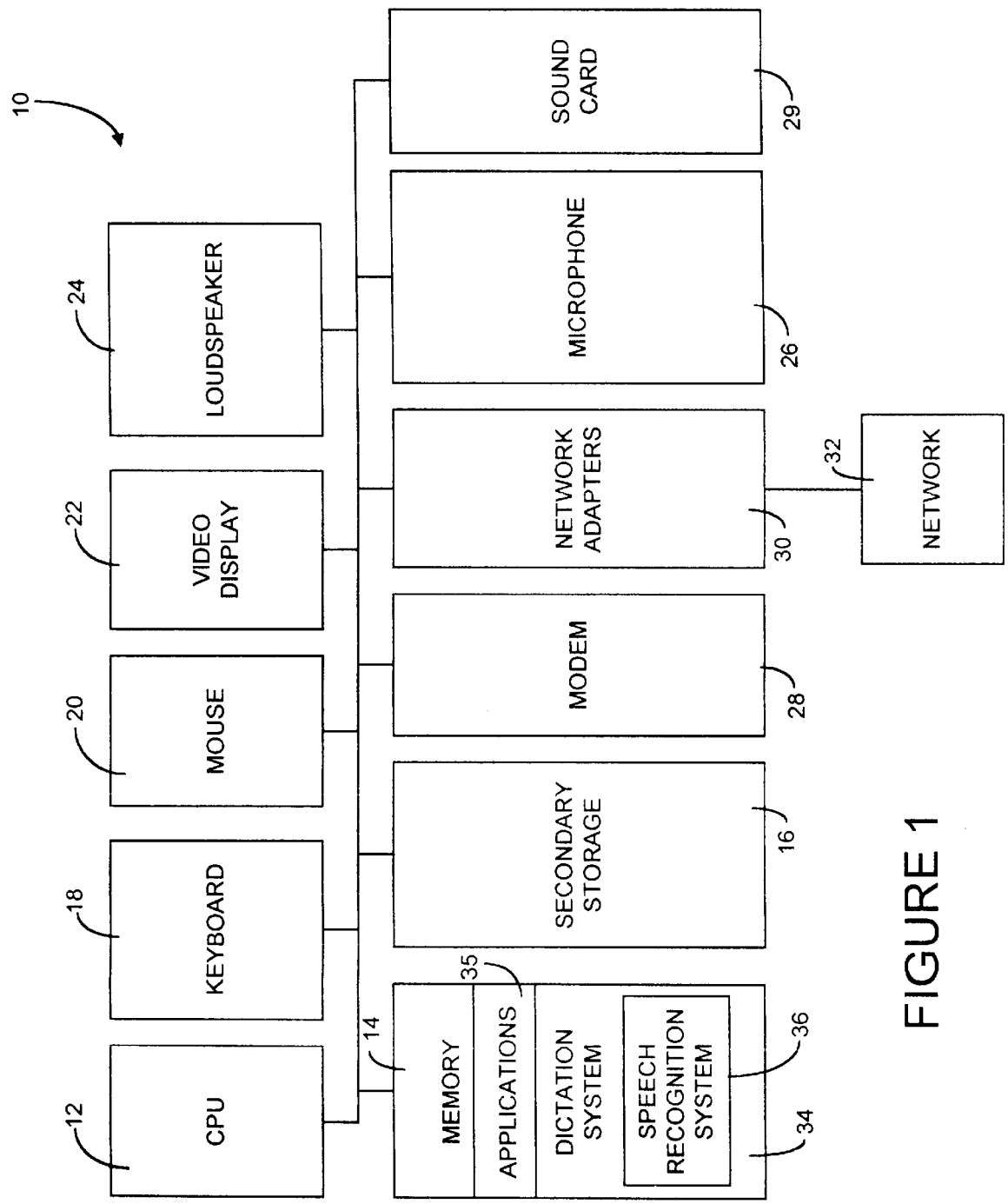
FIG. 1 is a block diagram of a computer system that is suitable for practicing the preferred embodiment of the present invention.

FIG. 1 is a block diagram of a computer system 10 that is suitable for practicing the preferred embodiment of the present invention. The computer system 10 includes a central processing unit (CPU) 12 that has access to a primary memory 14 and secondary storage 16. The secondary storage 16 may include removable media drives, such as a CD-ROM drive, which are capable of reading information stored on a computer-readable medium (e.g., a CD-ROM). The computer system 10 also includes a number of peripheral devices. These peripheral devices may include, for instance, a keyboard 18, a mouse 20, a video display 22, an audio loudspeaker 24, and a microphone 26. The computer system may additionally include a modem 28, a sound card 29 and a network adapter 30 that enables the computer system to interface with a network 32. The memory 14 holds program instructions and data for the dictation system 34. The instructions are run on the CPU 12 to realize the preferred embodiment of the present invention. The dictation system 34 may be used by application programs 35, such as word processing programs and messaging programs. The dictation system includes a speech recognition system 36.

Those skilled in the art will appreciate that the computer system configuration depicted in FIG. 1 is intended to be merely illustrative and not limiting of the present invention. The present invention may also be practiced with alternative computer system configurations, including multiple processor systems and distributed systems. For purposes of the discussion below, it is assumed that the steps that are performed by the preferred embodiment of the present invention are at the direction of the dictation system 34 or the speech recognition system 36.

Figure 2:
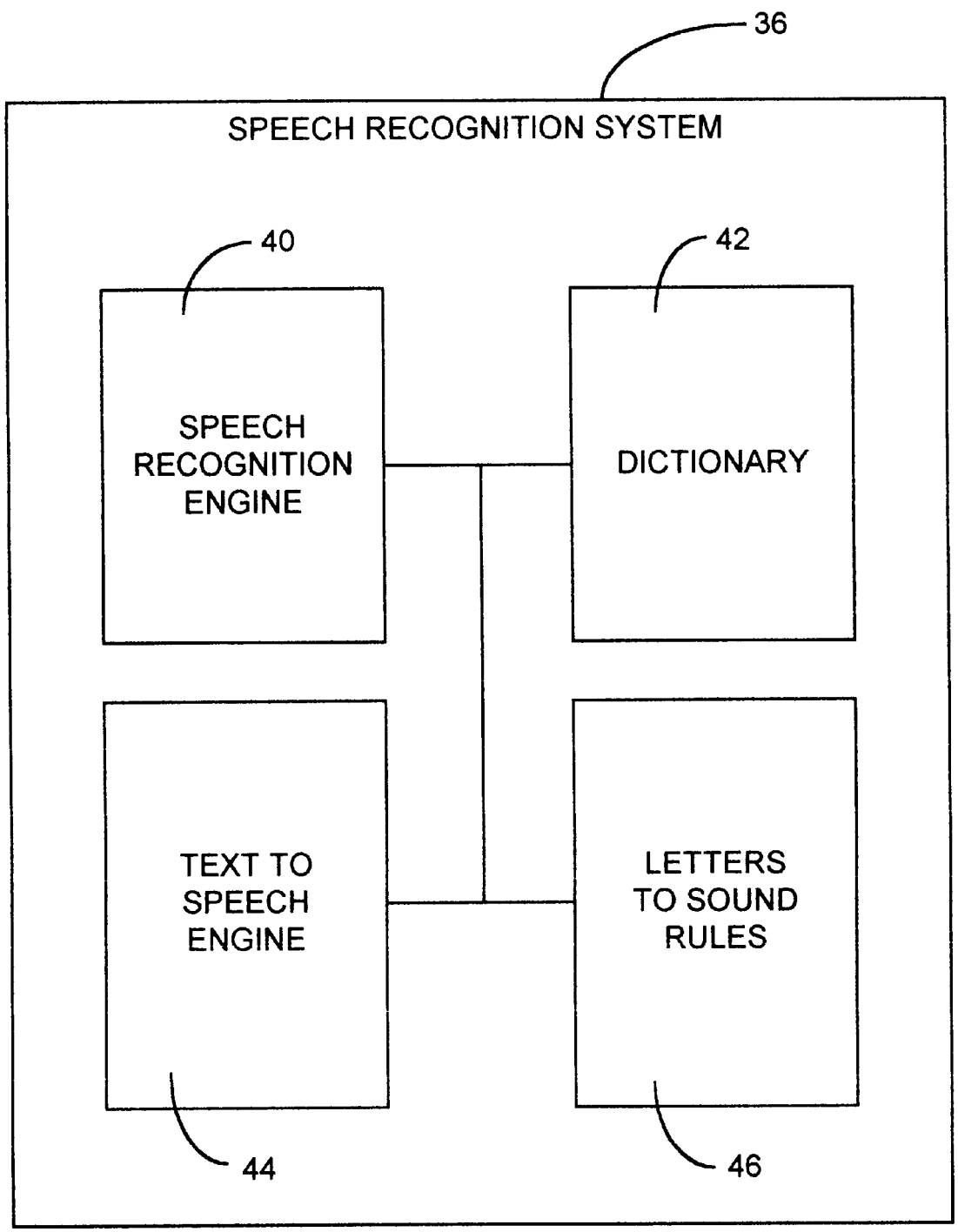
FIG. 2 is a block diagram that illustrates components of the speech recognition system.
Figure 3:
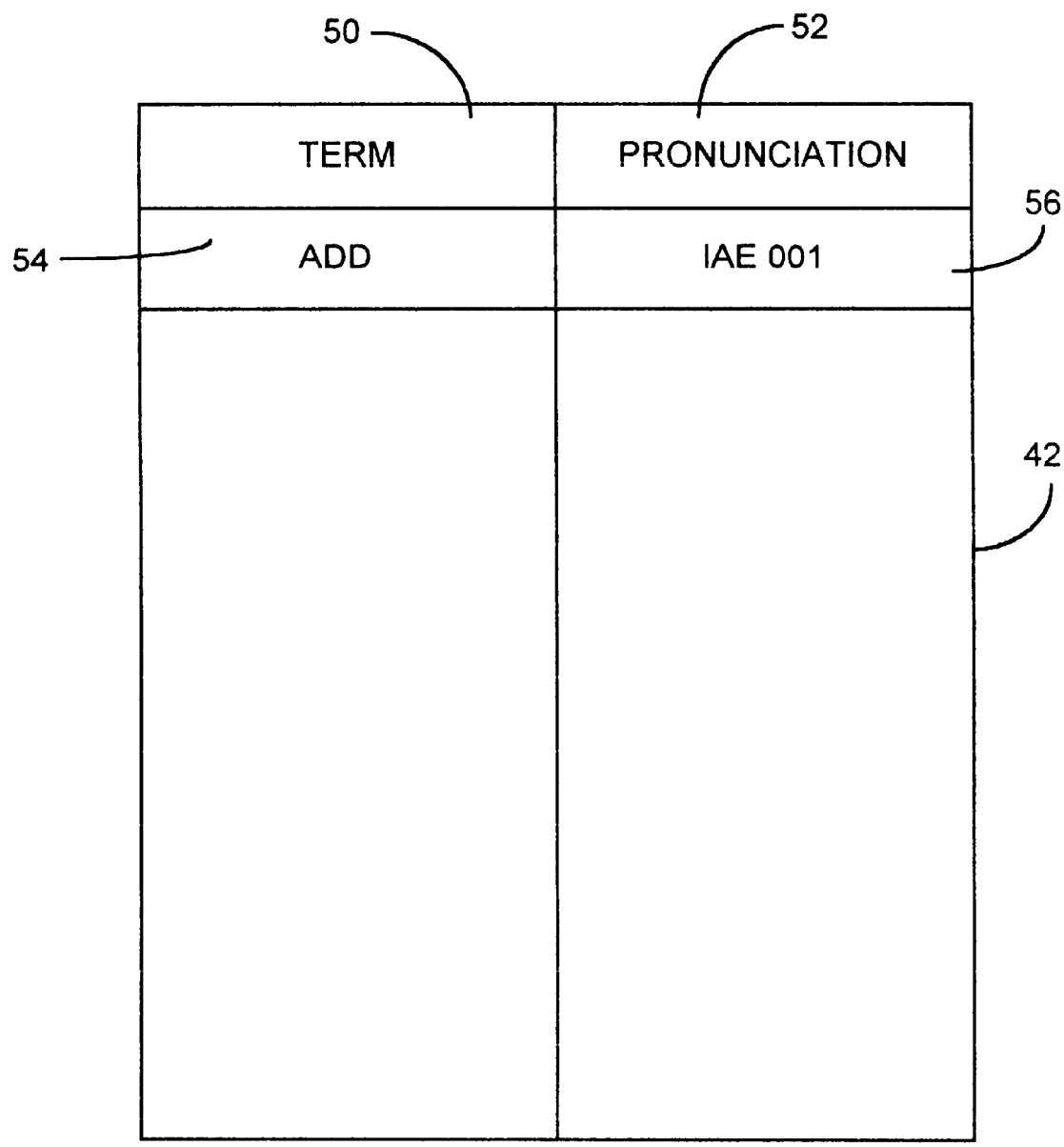
FIG. 3 is a diagram that illustrates an example portion of the dictionary.

A suitable speech recognition system for practicing the preferred embodiment of the present invention is described in copending application entitled "Method and System for Speech Recognition Using Continuous Density Hidden Markov Models," application Ser. No. 08/655,273, which was filed on May 1, 1996, which is assigned to a common assignee with the present application and which is explicitly incorporated by reference herein. FIG. 2 depicts the components of the speech recognition system 36 that are of particular interest to the discussion of the preferred embodiment of the present invention. The speech recognition system 36 includes a speech recognition engine 40 that utilizes a dictionary 42 and letter-to-sound rules 46. The dictionary holds a list of the terms that are recognized by the speech recognition engine 40 and the associated pronunciations. FIG. 3 depicts an example of a portion of the dictionary 42. Each entry within the dictionary 42 includes a field 50 for identifying the associated term and a field 52 for specifying the pronunciation of the term. FIG. 3 shows an example of an entry for the term "Add." The identity of the term is held within field 54 and the pronunciation of the term is held in field 56. The pronunciation of the term is specified in terms of phonemes.

The speech recognition system 36 may also include a text-to-speech engine 44 for converting text into spoken output. The text-to-speech engine 44 has access to the dictionary 42 and the letter-to-sound rules 46 that convert textual letters into corresponding sounds. The text-to-speech engine 44 first uses the dictionary 42 to locate pronunciations and then resorts to using the letter-to-sound rules 46 when the word being processed is not in the dictionary. Those skilled in the art will appreciate that the text-to-speech engine 44 need not be part of the speech recognition system, but rather may be part of a separate speech synthesis unit. Nevertheless, for purposes of the discussion below, it is assumed that the text-to-speech engine 44 is part of the speech recognition system 36. A suitable text-to-speech system is discussed in the copending application entitled "Method and System of Run Time Acoustic Unit Selection for Speech Synthesis," application Ser. No. 08/648,808, which was filed on Apr. 30, 1996, which is assigned to a common assignee with the present application and which is explicitly incorporated by reference herein. Those skilled in the art will further appreciate that the speech recognition engine 40 and the text-to-speech engine may have their own respective dictionaries and letter-to-sound rules.

Figure 4:
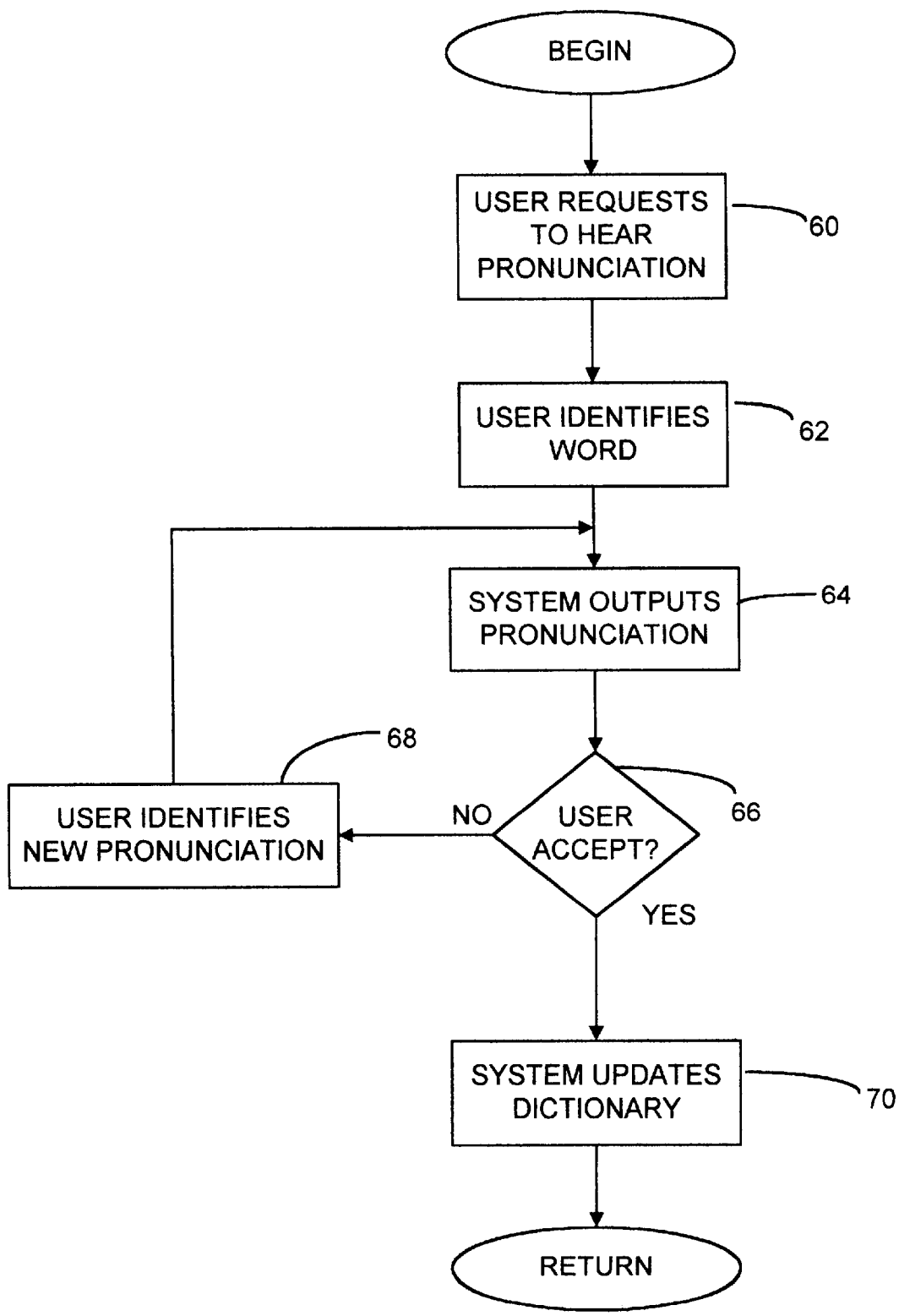
FIG. 4 is a flowchart illustrating the steps that are performed to enable a user to change the pronunciation of a term in the dictionary.
Figure 5A:
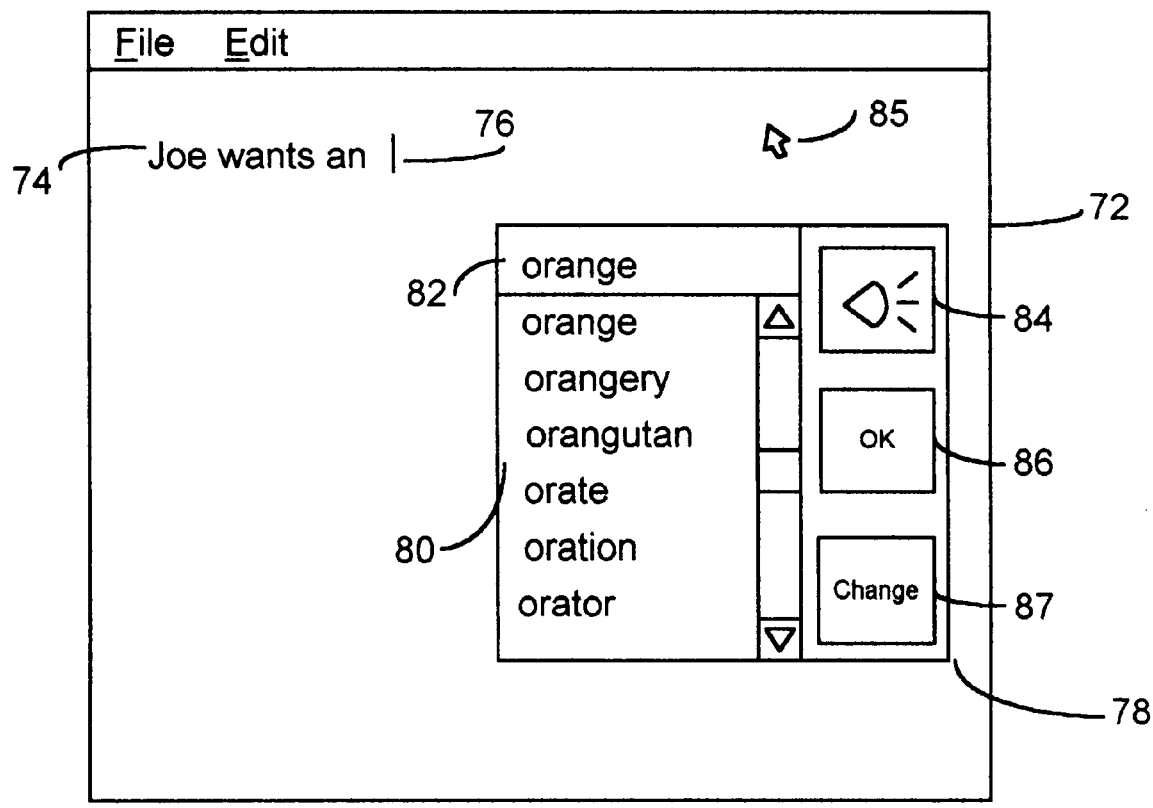
FIGS. 5A–5D depict user interface elements that are provided to enable a user to alter the pronunciation of a term of the dictionary.

FIG. 4 is a flow chart that illustrates the steps that are performed by the speech recognition system 36 to enable a user to change the pronunciation of a term that is stored within the dictionary 42. Initially, a user requests to hear the pronunciation of a given word (step 60 in FIG. 4). The user then identifies the term for which he wishes to hear the pronunciation (step 62 in FIG. 4). FIG. 5A shows an example of a user interface element 78 that is displayed when the user makes a request to hear the pronunciation of a word. The user interface element 78 includes a list 80 of alternatives for a spoken word. In the example shown in FIG. 5A, the words are organized alphabetically. The user may move through the list 80 to select the desired word. In the example depicted in FIG. 5A the user has selected the word "orange" that appears within the selection box 82. The user may then hear the pronunciation of the selected word (step 64 in FIG. 4) by activating button 84. A suitable means for activating the button 84 is to position a mouse cursor 85 on the button 84 and clicking a mouse button while the mouse cursor points at the button 84.

The user hears the pronunciation of the word and can then make a determination whether the pronunciation is correct. The output pronunciation is the default pronunciation that is utilized by the speech recognition system 36. If the user accepts the pronunciation (see step 66 in FIG. 4), the user may activate the "OK" button 86. On the other hand, if the user is not happy with the pronunciation (see step 66 in FIG. 4), the user may activate the "Change" button 87. In this fashion, the user requests the change of the pronunciation of the selected term (step 68 in FIG. 4).

Figure 5B:
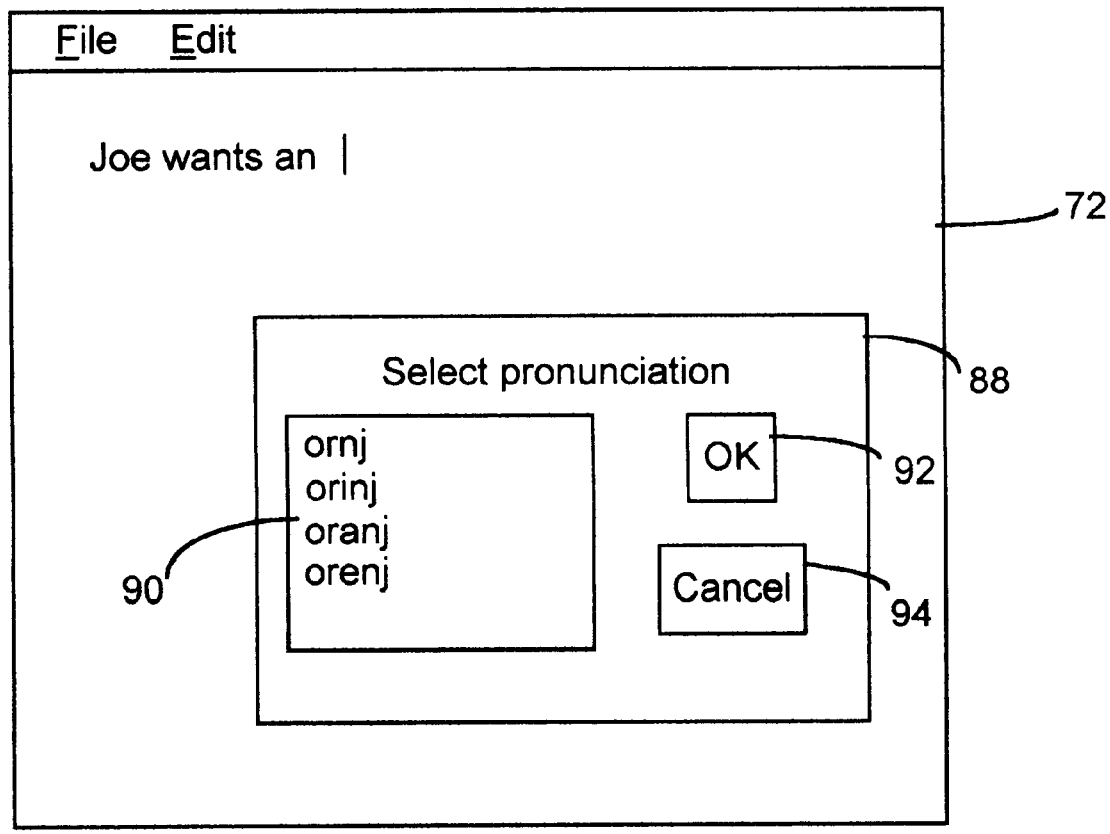

The user then identifies a new pronunciation for the selected term (step 68 in FIG. 4). FIG. 5B shows a first alternative by which the system provides multiple alternative pronunciations for the term and the user selects one of these pronunciations. In particular, as shown in FIG. 5B, a user interface element 88 is provided that asks users to select a pronunciation from one of the pronunciations listed in the list 90. The user may cancel the process of changing the pronunciation by activating the "Cancel" button 94 or may select one of the pronunciations within the list and hit the "OK" button 92 to accept the selected pronunciation as the new default pronunciation for the term.

Those skilled in the art will appreciate that there may be multiple ways of generating the alternative pronunciations for the terms. The system may have processed the corpus to generate multiple pronunciations for each term that is stored within the dictionary. Alternatively, the system may be provided with multiple templates for each term that adopt different pronunciations. Still further, the multiple pronunciations may be derived empirically from different pronunciations that users have input to the speech recognition system 36.

Figure 5C:
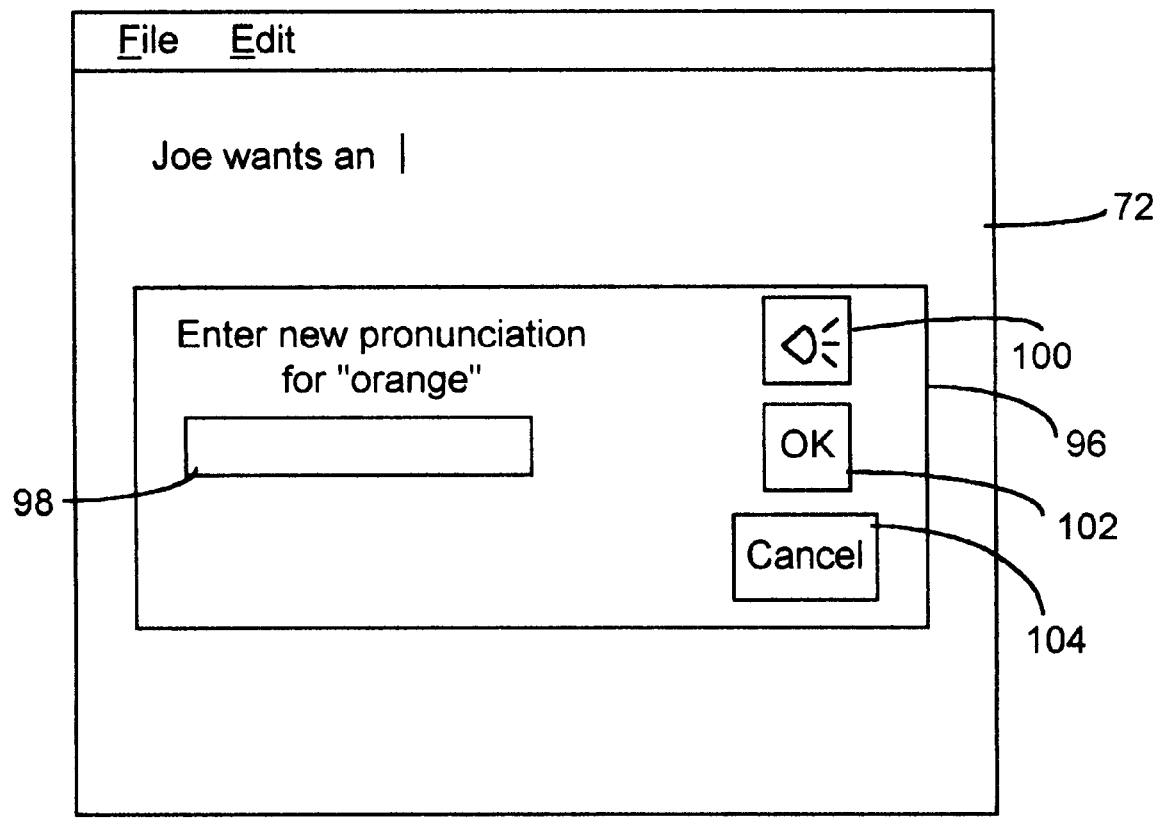

A second alternative is depicted in FIG. 5C. In the second alternative, the system does not provide the alternative pronunciation; rather the user enters the alternative pronunciation. A user interface element 96 like that depicted in FIG. 5C is displayed, and the user spells out the new pronunciation in text box 98. The user need not enter the phonemes for the pronunciation but rather need only enter a sequence of letters (i.e., a text string) that captures the desired pronunciation of the word. For example, if the user desires to spell out the pronunciations of the word "orange," the user might enter the string "ornj." The user may then hear how the system interprets the string that was entered in the text box 98 by activating button 100. The speech recognition system 36 processes the text string that was entered in the text box 98 using the letter-to-sound rules and the dictionary. If the user is satisfied with the resulting output pronunciation of the term, the user may activate the "OK" button 102. If the user wishes to not change the pronunciation, the user may activate the "Cancel" button 104. If the user is not satisfied with the output pronunciation but wishes to attempt to enter another pronunciation, the user types the alternative pronunciation in the text box 98 and repeats the process.

Figure 5D:
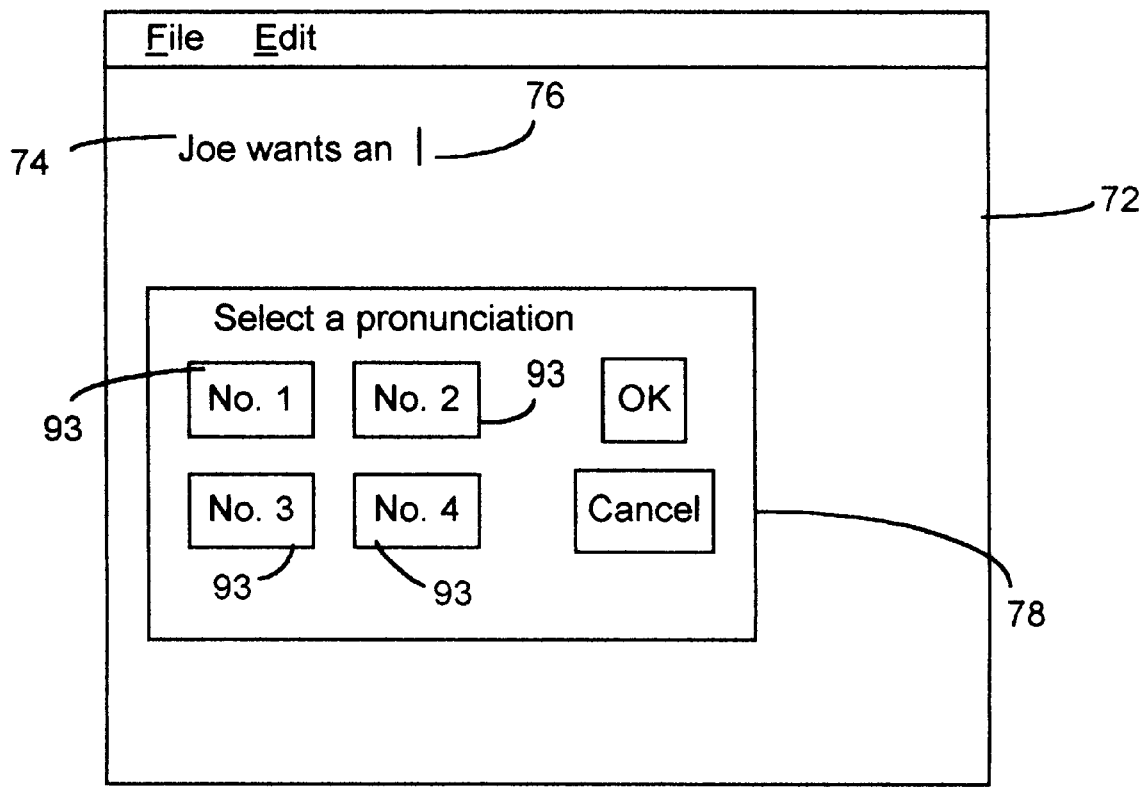

Those skilled in the art will appreciate that other alternatives may be used. For example, pronunciations may not be represented to the user as selectable text strings (as in the first alternative), but rather may be associated with particular user interface elements, such as buttons, that the user may active to hear alternative pronunciations. FIG. 5D shows an example where buttons 93 are displayed and each button is activatable to produce audio output for a separate pronunciation.

After the user has identified an acceptable new pronunciation (i.e., step 68 in FIG. 4), the system needs to update the dictionary accordingly. Specifically, the system replaces the pronunciation of the term within the dictionary with the newly identified pronunciation that is satisfactory to the user (step 70 in FIG. 4). Also, the system may propagate the change of the specific term to other terms in a systematic manner. For example, if a user pronounces "what" as "HH W AH T," then the change may be propagated to all words beginning with "wh" (e.g., "where" and "which"). Those skilled in the art will appreciate that, in alternative embodiments, the dictionary may hold multiple pronunciations and have a single pronunciation as the default pronunciation. In such alternative embodiments, the change of pronunciation is merely a change in the default pronunciation that is utilized by the speech recognition system 36.

Figure 6:
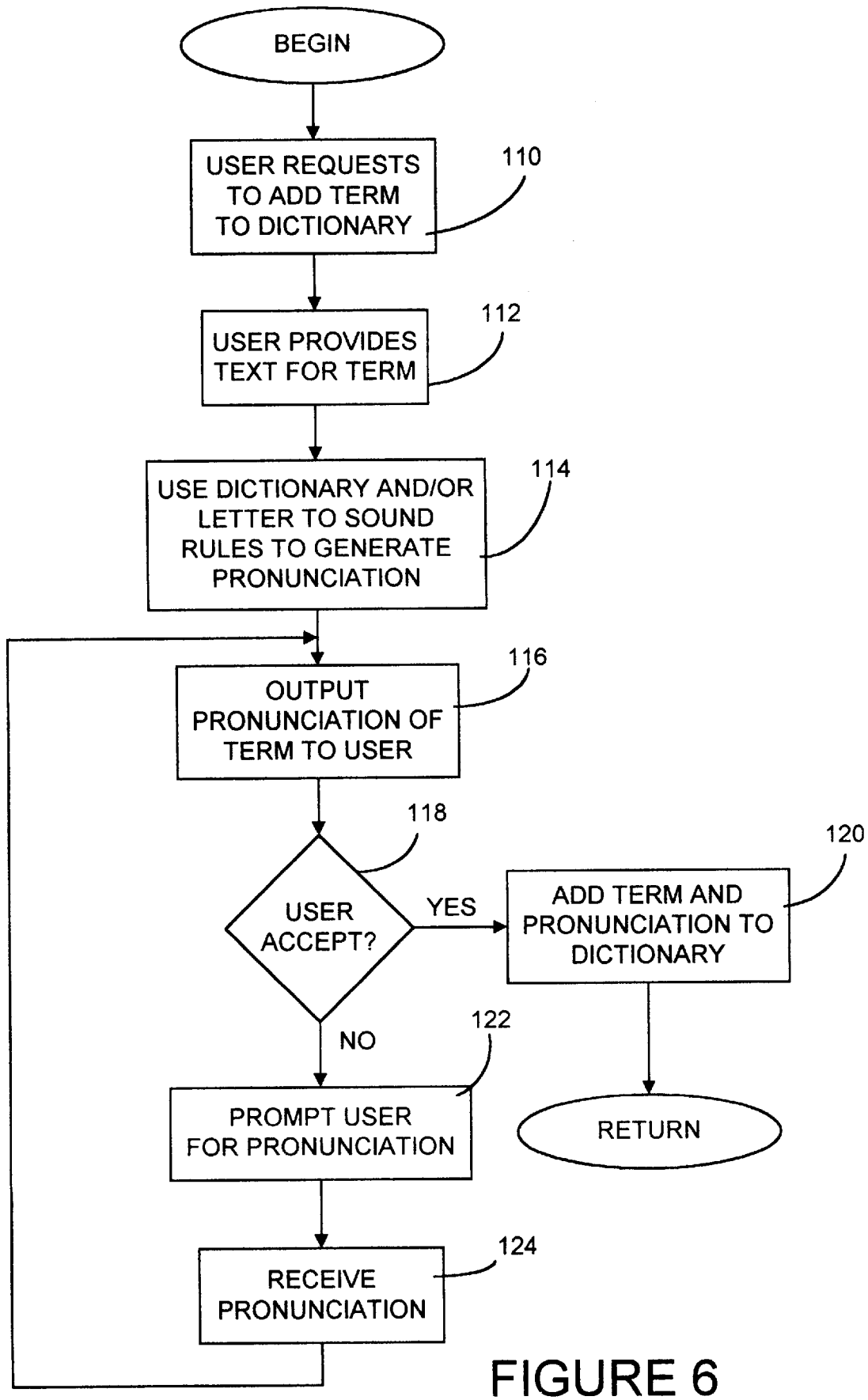
FIG. 6 is a flowchart illustrating the steps that are performed to add a new term to the dictionary.
Figure 7A:
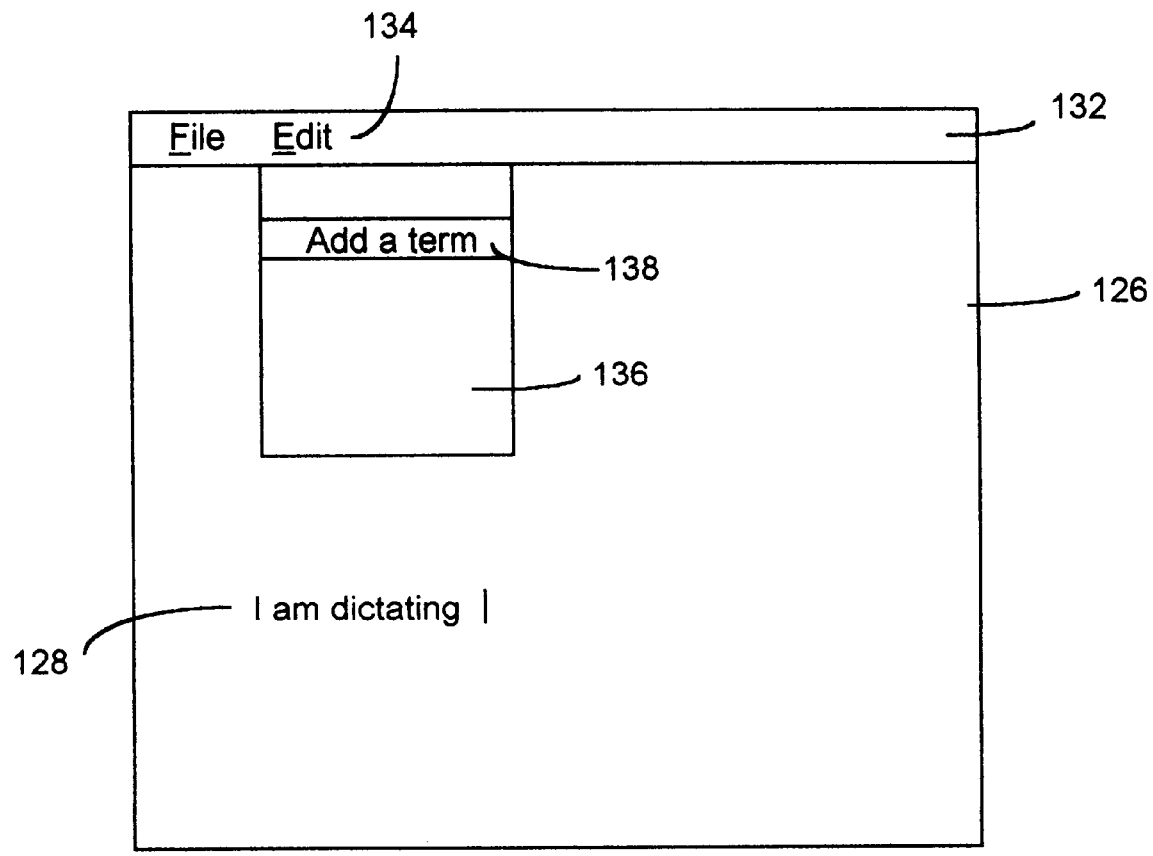
FIGS. 7A–7D illustrate user interface elements that are provided to enable a user to add a new term with a given pronunciation to the dictionary.

The speech recognition system of the preferred embodiment of the present invention is extensible in that new terms may be added to the dictionary. FIG. 6 is a flow chart illustrating the steps that are performed when a user desires to add a new term to the dictionary. First the user requests to add a new term to the dictionary (step 110 in FIG. 6). FIG. 7A shows an example of one user interface mechanism that may be provided by the dictation system 34 to enable a user to add a term to the dictionary 42. FIG. 7A depicts a window 26 of an application program that utilizes the dictation system 34. The window 126 includes a menu bar 132 on which is included an Edit menu header 134. When the user positions a mouse cursor over the Edit menu header 134 and depresses a mouse button, the menu 136 is depicted which includes a menu item 138 for adding a new term to the dictionary. A user may select the item 138 by positioning the mouse cursor to point at the item 138 and lifting the mouse button or clicking on the item. The window 126 holds text 126 that is produced by interpreting input that user has spoken within a microphone 26 by the dictation system 34 that uses the speech recognition system 36. The current cursor position 130 is indicated in FIG. 7A.

Figure 7B:
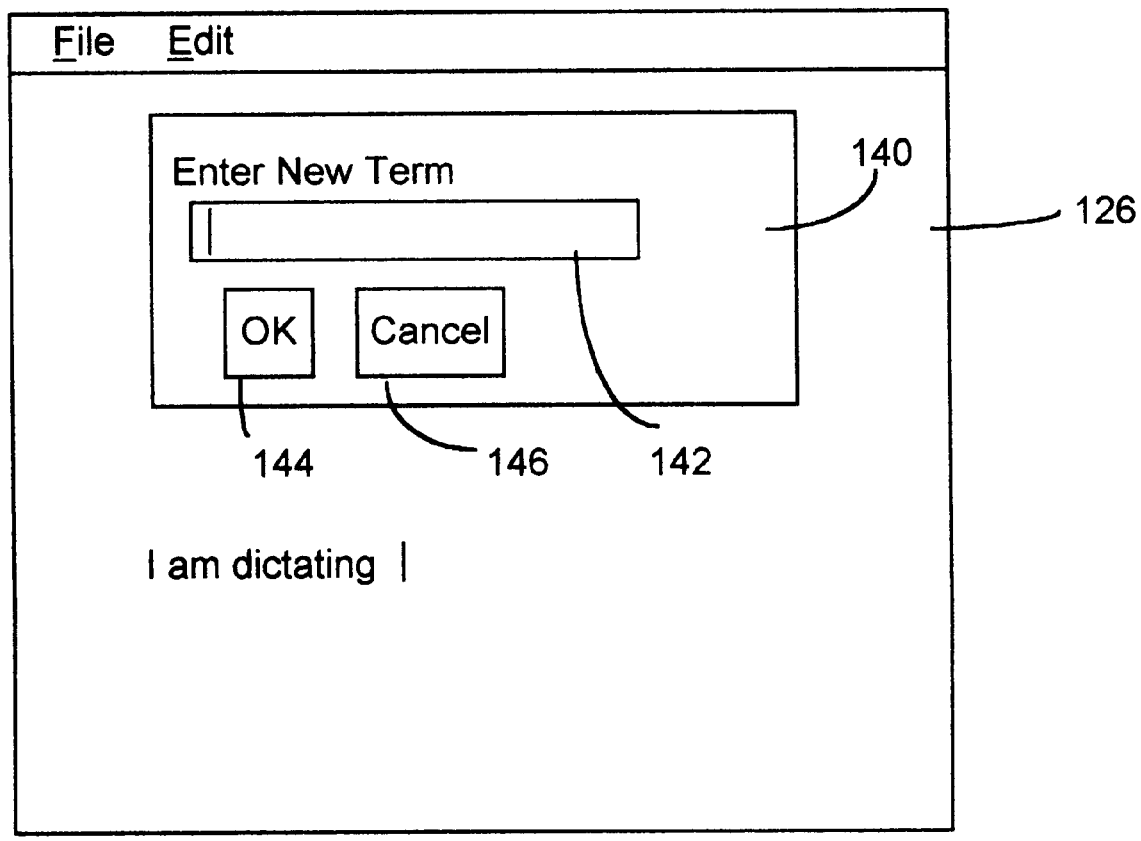
Figure 7C:
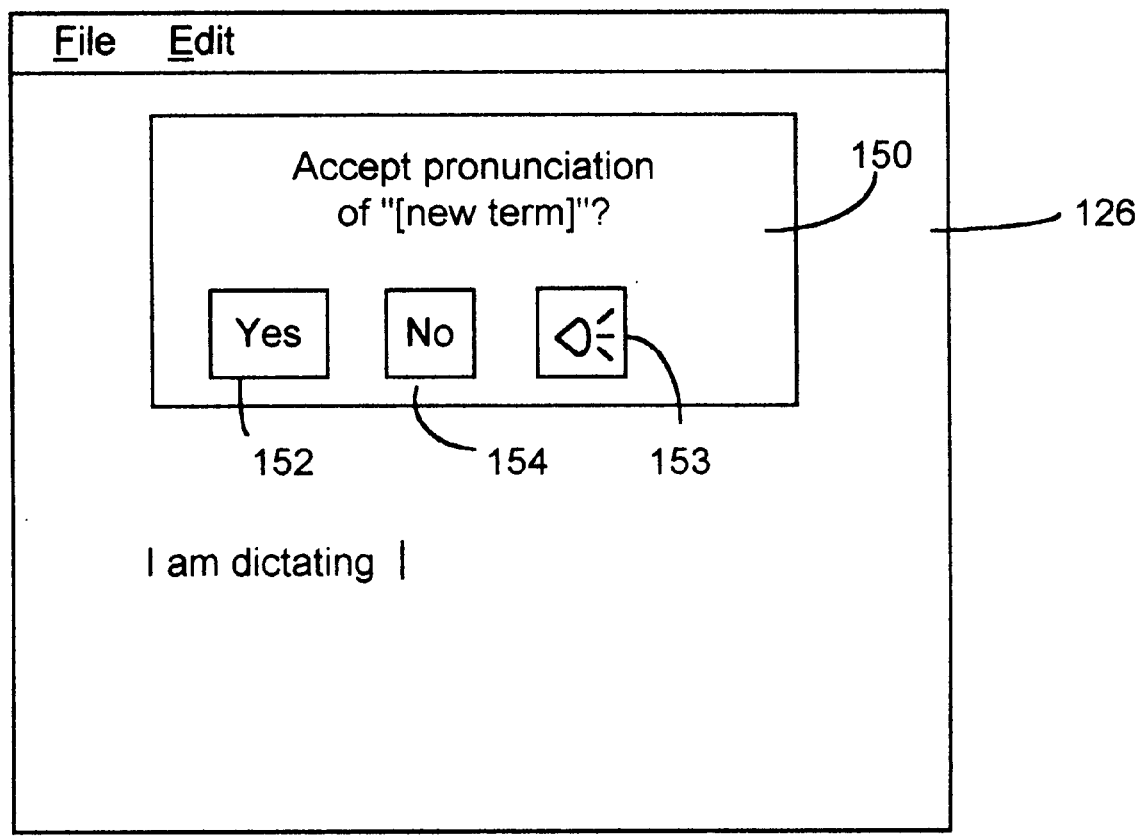
Figure 7D:
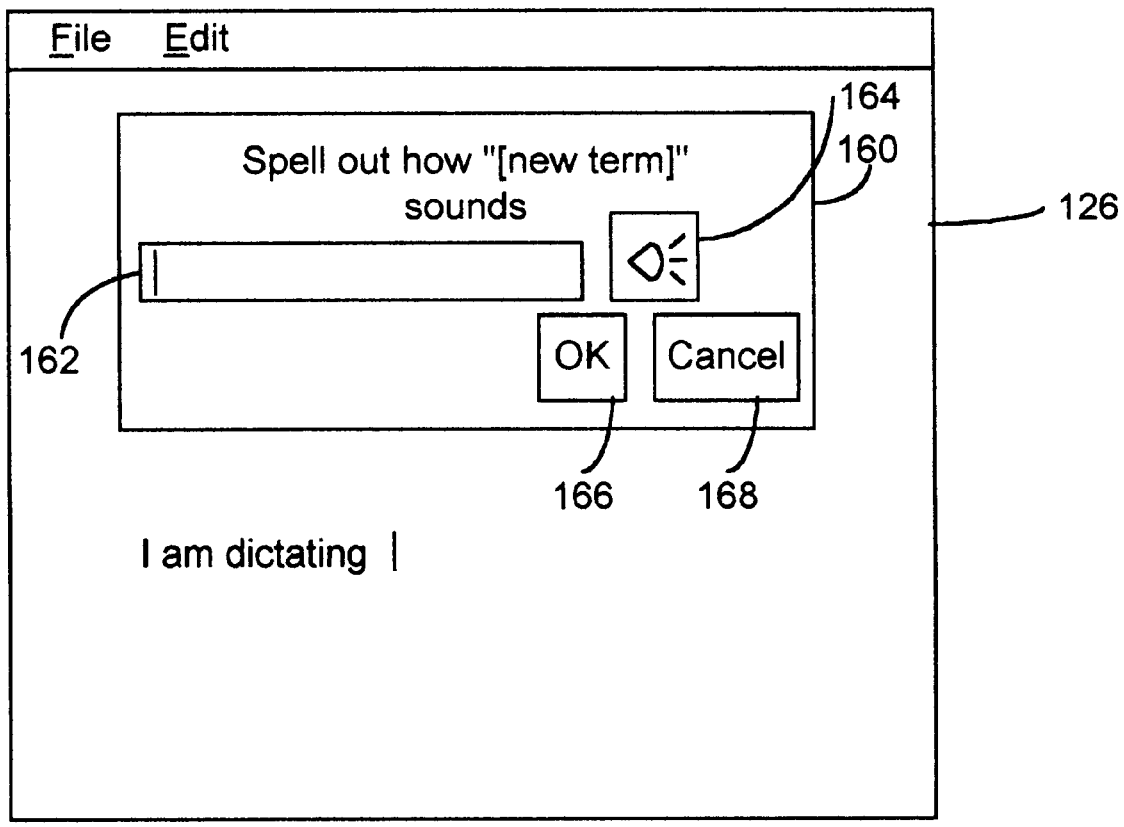

After the user selects a menu item entry 138, a dialog box 140, like that depicted in FIG. 7B, is displayed. This dialog box 140 asks the user to enter the text for the term that the user wishes to add to the dictionary. A text box 142 is provided within the dialog box 140. After the user enters the text, the user may continue the process of adding the new term by pressing the "OK" button 144 or may terminate the process by pressing the "Cancel" button 146. Hence, the user provides the text for the term that is to be added to the dictionary (step 112 of FIG. 6). The dictation system 34 passes the text onto the speech recognition system 36. The speech recognition system provides the text to the dictionary 42 and the letter-to-sound rules 46 to generate a pronunciation for the new term (step 114 in FIG. 6). The resulting pronunciation is then output over the audio loud speaker 24 to the user (step 116 in FIG. 6) so that the user can appreciate how the speech recognition system 36 expects the term to be pronounced. A user interface element 150 like that depicted in FIG. 7C may then be displayed to enable the user to accept or reject the pronunciation. For the example depicted in FIG. 7C, the user interface element 150 asks the user whether it accepts the pronunciation of the new term and includes a "Yes" button 152 for accepting the pronunciation, a "No" button 154 for rejecting the pronunciation and an audio output button 153 for generating audio output for the pronunciation of the new term. By activating these buttons, the user accepts or rejects the pronunciation produced by the text-to-speech engine 44 (see step 118 in FIG. 6).

Where the user accepts the pronunciation, the term and the associated pronunciation are added to the dictionary 42 (step 120 in FIG. 6). The associated pronunciation will be used in recognizing future spoken instances of the term. If, however, the user does not accept the pronunciation, the system then prompts the user for the pronunciation (step 122 in FIG. 6). The speech recognition system 136 realizes that the pronunciation produced by the dictionary 42 and letter-to-sound rules 46 was not acceptable to user and, thus, asks the user to produce a representation of the pronunciation for the word. The speech recognition system 36 displays a dialog box 160 like that depicted in FIG. 7D to request the user to enter the pronunciation for the new term. The dialog box 160 includes a text box 162 in which a user may enter a text string that spells out how the new terms should sound. After the user has entered text into the text box 162, the user may activate button 164 to hear how the system interprets the text that is entered in the text box. Specifically, the system generates a spoken representation of the pronunciation entered in the text box 162 that is output over the loud speaker 24. Once the user has entered a text string that produces an acceptable pronunciation, the user may change the pronunciation by activating the "OK" button 166. The user may also cancel the change in the pronunciation by activating the "Cancel" button 168. In general, the system will prompt the user for pronunciation (step 122 ), receive the pronunciation entered by the user (step 124 ) and output the pronunciation that has been received from the user until the user accepts the resulting pronunciation. Alternatively, the system may compare the current pronunciation with newly added pronunciation entered by the user and if close enough, not prompt the user again to accept or reject.

Figure 8:
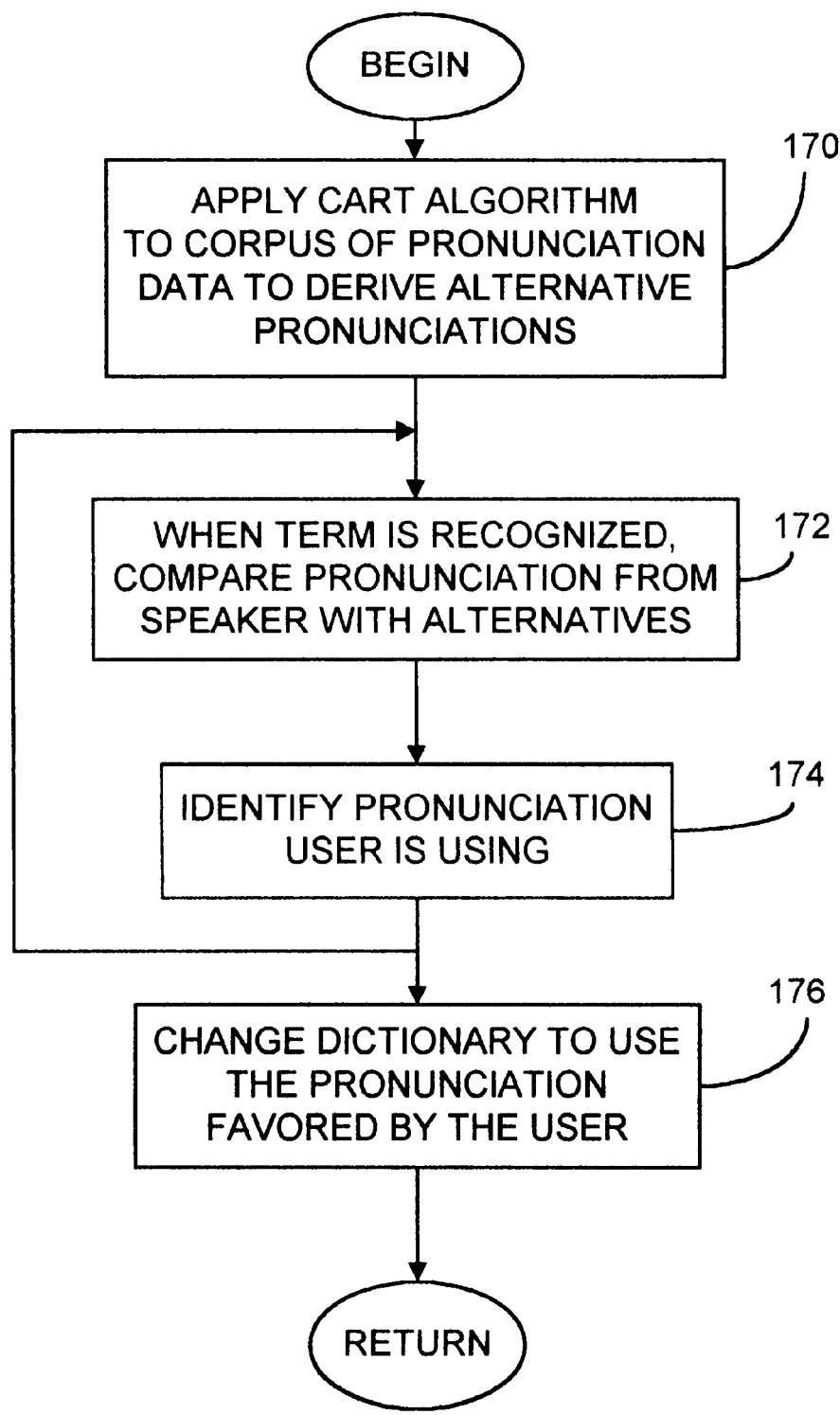
FIG. 8 is a flowchart illustrating the steps that are performed to alter the pronunciations stored within the dictionary without interactive user input.

The system may also transparently update the pronunciations stored within the dictionary 42 without explicit user request. This mechanism may be utilized independent of the above-described user initiated approach to updating the pronunciation of a term stored within the dictionary 42 or in conjunction with that approach. Initially, the system is provided with a corpus of pronunciation data and the system applies an algorithm such as a classification and regression tree ("CART") algorithm to derive alternative pronunciations for the associated terms (step 170 in FIG. 8). CART algorithms are well-known in the art and are described in numerous publications including Breiman et al., *Classification and Regression Trees*, 1984. Those skilled in the art will appreciate that other heuristics may be applied to derive the pronunciations. The derived alternative pronunciations are stored for later use. When a user speaks a term and the term is recognized, the system compares how the user spoke the term with the alternative pronunciations stored for the term (step 172 in FIG. 8). This process is repeated (see return arrow to step 172 in FIG. 8) until the system is confident that it can accurately identify which of the alternative pronunciations the user is using (see step 174 in FIG. 8). The system may, for example, require that a desired number of hits for one of the alternative pronunciations be received before the system reaches a level of confidence sufficient so as to identify that pronunciation as the pronunciation that the user is using. The speech recognition system 36 then changes the dictionary 42 to use the pronunciation favored by the user (i.e., the pronunciation that the system identified as that being used by the user) (step 176 in FIG. 8).

While the preferred embodiment of the present invention has been described with reference to a preferred embodiment thereof, those skilled in the art would appreciate that various changes in form and detail may be made without departing from the intended scope of the present invention as defined in the appended claims.

We claim:

1. In a computer-implemented speech recognition system that recognizes speech input from a speaker and that includes an audio output device, a method comprising the computer-implemented steps of:

providing a text-to-speech mechanism for creating a spoken version of text;

for a given word of text, using the text-to-speech mechanism to generate a spoken version of the given word;

outputting the spoken version of the given word on the audio output device so that a user of the speech recognition system knows how the speech recognition system expects the given word to be pronounced; and providing a user interface element for a user to request a different pronunciation of the given word and wherein the spoken version of the given word is output in response to the user requesting the different pronunciation of the given word via the user interface element.

2. The method of claim 1 wherein the user interface element is an activatable button that the user activates to request a proper pronunciation of a portion of text.

3. The method of claim 1 wherein the speech recognition system includes a list of words that the speech recognition system recognizes and a mechanism for the user to add words to the list and wherein the using step and the outputting step are triggered by the user adding a new word to the list such that a spoken version of the new word is output.

4. The method of claim 1, further comprising the step of receiving the textual representation of the given word from the user prior to using the text-to-speech mechanism.

5. The method of claim 1, further comprising the steps of:

receiving a designation of a different spoken version of the given word from the user as a proper pronunciation of the given word; and modifying how the speech recognition system expects the given word to be pronounced to reflect the different spoken versions of the given word designated by the user.

6. The method of claim 1 wherein the speech recognition system is used in a dictation system for converting spoken speech into text.

7. The method of claim 1 wherein the speech recognition system has at least one expected pronunciation for the given word and the spoken version of the given word generated by the text-to-speech mechanism corresponds to the expected pronunciation of the given word.

8. In a computer-implemented dictation system for converting spoken input from a user into text, a method comprising the steps of:

providing a list of pronunciation for words that are recognized by the dictation system;

providing an audible current pronunciation of a selected word stored in the list;

receiving a request from a user to change the current pronunciation of the selected word that is stored in the list to a new pronunciation, said request specifying the new pronunciation; and changing the pronunciation stored in the list for the selected word from the current pronunciation to the new pronunciation.

9. The method of claim 8, further comprising the step of providing a user interface through which the user makes the request to change the current pronunciation of the selected word.

10. The method of claim 9 wherein the user interface enables a user to spell out the new pronunciation of the selected word with letters.

11. The method of claim 8 wherein the dictation system includes an audio output device and wherein the step of providing an audible current pronunciation of the selected word to the user is performed before receiving the request.

12. The method of claim 8 wherein the dictation system includes an audio output device and wherein receiving the request step further comprises the steps of:

receiving a text string that specifies what the user believes the new pronunciation of the selected word sounds like;

providing a user interface element for a user to hear how the dictation system envisions the text string sounding like;

providing a text-to-speech engine for converting text into speech having an associated pronunciation;

using the text-to-speech engine to output speech for the text string on the audio output device in response to the user using the user interface element; and generating the request in response to the user accepting the speech generated by the text-to-speech engine for the text string as a proper pronunciation of the selected word.

13. The method of claim 12, further comprising the step of providing an additional user interface element for the user to accept or reject the pronunciation associated with the speech that is output by the text-to-speech engine.

14. In a computer-implemented speech recognition system that recognizes speech input from a speaker and that includes an audio output device, a method comprising the steps of:

providing a dictionary of terms that the speech recognition system recognizes, said dictionary specifying how the speech recognition system expects each term to be pronounced;

receiving a request from a user to add a new term to the dictionary;

generating a pronunciation for the new term by the speech recognition system;

outputting the pronunciation for the new term on the audio output device so a user can observe and change the pronunciation for the new term; and adding the new term and the generated pronunciation to the dictionary.

15. The method of claim 14 wherein the speech recognition system includes a text-to-speech engine for converting text into speech and wherein the text-to-speech engine is used to output the pronunciation of the new term.

16. The method of claim 15 wherein the text-to-speech engine uses letter-to-sound rules are used to generate the pronunciation for the new term.

17. The method of claim 14 wherein the method further comprises the step of prompting the user to verify that the generated pronunciation of the new term is correct.

18. The method of claim 17 wherein when the user verifies that the generated pronunciation of the new term is not correct, receiving a designation of a proper pronunciation for the new term from the user and adding the proper pronunciation to the dictionary.

19. In a computer-implemented speech recognition system for recognizing speech spoken from a speaker, said system including an audio output device and a text-to-speech engine for generating speech from text, a method comprising the steps of:

storing multiple pronunciations for a selected word in a dictionary that is used by the text-to-speech engine;

outputting each of the pronunciations on the audio output device so that a user can hear the pronunciations; and in response to a user selecting one of the pronunciations, using the selected pronunciation by the speech recognition system to recognize speech.

20. The method of claim 19 wherein the speech recognition system is used in a dictation system that converts speech spoken by a speaker into text.

21. In a computer-implemented speech recognition system for recognizing speech from a speaker, a method comprising the steps of:
provided a dictionary of terms having pronunciations for the terms that correspond with how the speech recognition system expects the terms to be pronounced;
performing a heuristic to derive alternative pronunciations for the terms;
on multiple instances where the speaker speaks a selected one of terms such that the speech recognition system recognizes the selected term, determining which of the alternative pronunciations of the selected terms the user used; and
based on the determining step, identifying which of the alternative pronunciations of the selected term the user is most likely using and updating the dictionary to designate the pronunciation that the user is most likely using as how the speech recognition system expects the selected term to be pronounced.

22. The method of claim 21 wherein the CART algorithm is applied to derive the alternative pronunciations.

23. In a computer-implemented speech recognition system for recognizing spoken speech from a speaker, said system having an output device, a method comprising the steps of:
receiving a spoken version of a term having a given pronunciation from the speaker;
providing an expected pronunciation for the term that corresponds to how the speech recognition system expects the speaker to speak the term;
comparing the given pronunciation of the spoken version of the term with the expected pronunciation of the term to determine a degree of difference between the given pronunciation of the spoken version of the term and the expected pronunciation of the term; and
where the degree of difference exceeds an acceptable predetermined threshold, generating output on the output device to inform the speaker that the degree of difference exceeds the threshold.

24. The method of claim 23 wherein the speech recognition system is used in a dictation system for generating text from speech.

25. The method of claim 23 wherein the output device is an audio output device and wherein the output is audio output.

26. The method of claim 23 wherein the output device is a video output device and wherein the output is video output.

27. The method of claim 23 wherein the system includes a text-to-speech mechanism and wherein the text-to-speech mechanism generates a spoken version of the term.

28. In a computer-implemented speech recognition system that recognizes speech input from a speaker and that includes an audio output device, a computer-readable medium holding computer-executable instructions for performing a method comprising the computer-implemented steps of:
providing a text-to-speech mechanism for creating a spoken version of text;
for a given word of text, using the text-to-speech mechanism to generate a spoken version of the given word;
outputting the spoken version of the given word on the audio output device so that a user of the speech recognition system knows how the speech recognition system expects the given word to be pronounced; and
providing a user interface element for a user to request a proper pronunciation of the given word and wherein the spoken version of the given word is output in response to the user requesting the proper pronunciation of the given word via the user interface element.

29. The computer-readable medium of claim 28 wherein the user interface element is an activatable button that the user activates to request a proper pronunciation of a portion of text.

30. The computer-readable medium of claim 28 wherein the speech recognition system includes a list of words that the speech recognition system recognizes and a mechanism for the user to add words to the list and wherein the using step and the outputting step are triggered by the user adding a new word to the list such that a spoken version of the new word is output.

31. The computer-readable medium of claim 28 wherein the method further comprises the steps of:
receiving a designation of a different spoken version of the given word from the user as a proper pronunciation of the given word; and
modifying how the speech recognition system expects the given word to be pronounced to reflect the different spoken versions of the given word designated by the user.

32. The computer-readable medium of claim 28 wherein the speech recognition system is used in a dictation system for converting spoken speech into text.

33. The computer-readable medium of claim 28 wherein the speech recognition system has at least one expected pronunciation for the given word and the spoken version of the given word generated by the text-to-speech mechanism corresponds to the expected pronunciation of the given word.

34. In a computer-implemented dictation system for converting spoken input from a user into text, a computer-readable medium holding computer-executable instructions for performing a method comprising the steps of:
providing a list of pronunciations for words that are recognized by the dictation system;
providing an audible current pronunciation of a selected word stored in the list;
receiving a request from a user to change the current pronunciation of the selected word that is stored in the list to a new pronunciation, said request specifying the new pronunciation; and
changing the pronunciation stored in the list for the selected word from the current pronunciation to the new pronunciation.

35. The computer-readable medium of claim 34 wherein the method further comprises the step of providing a user interface through which the user makes the request to change the current pronunciation of the selected word.

36. The computer-readable medium of claim 35 wherein the user interface enables a user to spell out the new pronunciation of the selected word with letters.

37. The computer-readable medium of claim 34 wherein the dictation system includes an audio output device and wherein the method further comprises the step of outputting the current pronunciation of the selected word to the user with the audio output device before receiving the request.

38. The computer-readable medium of claim 34 wherein the dictation system includes an audio output device and wherein the receiving the request step further comprises the steps of:
receiving a text string that specifies what the user believes the new pronunciation of the selected word sounds like;
providing a user interface element for a user to hear how the dictation system envisions the text string sounding like;

providing a text-to-speech engine for converting text into speech having an associated pronunciation;

using the text-to-speech engine to output speech for the text string on the audio output device in response to the user using the user interface element; and generating the request in response to the user accepting the speech generated by the text-to-speech engine for the text string as a proper pronunciation of the selected word.

39. In a computer-implemented speech recognition system that recognizes speech input from a speaker and that includes an audio output device, a computer-readable medium holding computer-executable instructions for performing a method comprising the steps of:

providing a dictionary of terms that the speech recognition system recognizes, said dictionary specifying how the speech recognition system expects each term to be pronounced;

receiving a request from a user to add a new term to the dictionary;

generating a pronunciation for the new term by the speech recognition system;

outputting the pronunciation for the new term on the audio output device so a user can observe and change the pronunciation for the new term; and adding the new term and the generated pronunciation to the dictionary.

40. The computer-readable medium of claim 39 wherein the speech recognition system includes letter-to-sound rules for converting textual letters into sounds and wherein the letter-to-sound rules and/or dictionary are used to generate the pronunciation of the new term.

41. The computer-readable medium of claim 39 wherein the method further comprises the step of prompting the user to verify that the generated pronunciation of the new term is correct.

42. The computer-readable medium of claim 41 wherein when the user verifies that the generated pronunciation of the new term is not correct, receiving a designation of a proper pronunciation for the new term from the user and adding the proper pronunciation to the dictionary.

43. In a computer-implemented speech recognition system for recognizing speech spoken from a speaker, said system including an audio output device and a text-to-speech engine for generating speech from text, a computer-readable medium holding computer-executable instructions for performing a method comprising the steps of:

storing multiple pronunciations for a selected word in a dictionary that is used by the text-to-speech engine;

outputting each of the pronunciations on the audio output device so that a user can hear the pronunciations; and in response to a user selecting one of the pronunciations, using the selected pronunciation by the speech recognition system to recognize speech.

44. The computer-readable medium of claim 43 wherein the speech recognition system is used in a dictation system that converts speech spoken by a speaker into text.

45. In a computer-implemented speech recognition system for recognizing speech from a speaker, a computer-readable medium holding computer-executable instructions for performing a method comprising the steps of:

providing a dictionary of terms having pronunciations for the terms that correspond with how the speech recognition system expects the terms to be pronounced;

deriving alternative pronunciations of the terms by applying a heuristic;

on multiple instances where the speaker speaks a selected one of terms such that the speech recognition system recognizes the selected term, determining which of the alternative pronunciations of the selected terms the user used; and based on the determining step, identifying which of the alternative pronunciations of the selected term the user is most likely using and updating the dictionary to designate the pronunciation that the user is most likely using as how the speech recognition system expects the selected term to be pronounced.

46. In a computer-implemented speech recognition system for recognizing spoken speech from a speaker, said system having an output device, a computer-readable medium holding computer-executable instructions for performing a method comprising the steps of:

receiving a spoken version of a term having a given pronunciation from the speaker;

providing an expected pronunciation for the term that corresponds to how the speech recognition system expects the speaker to speak the term;

comparing the given pronunciation of the spoken version of the term with the expected pronunciation of the term to determine a degree of difference between the given pronunciation of the spoken version of the term and the expected pronunciation of the term; and where the degree of difference exceeds an acceptable predetermined threshold, generating output on the output device to inform the speaker that the degree of difference exceeds the threshold.

47. In a computer-implemented speech recognition system for recognizing spoken speech from a speaker, said system having a display device, a method comprising the steps of:

providing an expected pronunciation of a given word that constitutes how the speech recognition system expects the given word to be pronounced by the speaker;

gathering statistics regarding how frequently the given word of spoken speech from the speaker is misrecognized by the speech recognition system; and where the statistics indicate that the given word is misrecognized more frequently than a threshold value, prompting the user by generating output on the display device through a user interface element such that the user can request a different pronunciation to correct the expected pronunciation of the given word, a spoken version of the given word with a corrected expected pronunciation being output by the user interface element.

48. A speech recognition system for recognizing speech from a speaker, comprising:

an input device for receiving speech input from the speaker;

a speech recognition engine for recognizing speech in the speech input received from the speaker by the input device wherein the speech recognition engine has expected pronunciations for portions of speech;

a text-to-speech engine for producing a spoken representation of text constituting a selected portion of speech;

an audio output device for outputting the spoken representation of the text from the text-to-speech engine so that the user knows the expected pronunciation of the selected portion of speech; and an interface component configured to receive a new pronunciation from the user, indicative of a pronunciation more closely conforming to a pronunciation used by the user.

49. The speech recognition system of claim 48 wherein the text-to-speech engine is part of the speech recognition engine.

50. The speech recognition system of claim 48 wherein the speech recognition system further comprises a dictionary holding expected pronunciations of words for use by the text-to-speech engine in producing the spoken representation of text.

51. The speech recognition system of claim 48 wherein the speech recognition system further comprises letter-to-sound rules for converting textual letters into sounds for use by the text-to-speech engine in producing the spoken representation of text.

\* \* \* \* \*

UNITED STATES PATENT AND TRADEMARK OFFICE
CERTIFICATE OF CORRECTION

PATENT NO. : 5933804
DATED : August 3, 1999
INVENTOR(S) : Xuedong D. Huag et al.

It is certified that error appears in the above-identified patent and that said Letters Patent is hereby corrected as shown below:

```
Column 7, line 19, delete "26" insert -- 126 --
Column 7, line 29, delete "126" insert -- 128 --
Column 7, line 67, delete "136" insert -- 36 --
```

Claims

```
Column 10, line 43, delete "are used"
```

Signed and Sealed this

Sixteenth Day of May, 2000

*Attest:*

Q. TODD DICKINSON

*Attesting Officer*  *Director of Patents and Trademarks*